United States Patent
Glejbøl et al.

(10) Patent No.: US 6,739,355 B2
(45) Date of Patent: May 25, 2004

(54) ARMOURED, FLEXIBLE PIPE AND USE OF SAME

(75) Inventors: Kristian Glejbøl, Glostrup (DK); Jakob Wedel-Heinen, Charlottenlund (DK); Jan Christian Rytter, København S (DK)

(73) Assignee: NKT Flexibles I/S, Brondby (DK)

(*) Notice: Subject to any disclaimer, the term of this patent is extended or adjusted under 35 U.S.C. 154(b) by 0 days.

(21) Appl. No.: 10/257,638

(22) PCT Filed: Apr. 11, 2001

(86) PCT No.: PCT/DK01/00262
§ 371 (c)(1),
(2), (4) Date: Feb. 25, 2003

(87) PCT Pub. No.: WO01/81809
PCT Pub. Date: Nov. 1, 2001

(65) Prior Publication Data
US 2003/0164196 A1 Sep. 4, 2003

(30) Foreign Application Priority Data

Apr. 25, 2000 (DK) .......................................... 2000 00672
Nov. 15, 2000 (DK) .......................................... 2000 01707

(51) Int. Cl.⁷ ............................................... F16L 11/16
(52) U.S. Cl. ........................ 138/135; 138/133; 138/138; 138/134
(58) Field of Search ................................ 138/135, 134, 138/133, 129, 132, 130, 138

(56) References Cited

U.S. PATENT DOCUMENTS

| | | | |
|---|---|---|---|
| 2,087,876 A | 7/1937 | Peterson | 138/134 |
| 3,858,616 A * | 1/1975 | Thiery et al. | 138/133 |
| 4,301,200 A | 11/1981 | Langenfeld et al. | 138/129 X |
| 6,065,501 A * | 5/2000 | Feret et al. | 138/134 |
| 6,192,941 B1 * | 2/2001 | Mallen-Herrero et al. | 138/135 |
| 6,253,793 B1 * | 7/2001 | Dupoiron et al. | 138/135 |
| 6,283,161 B1 * | 9/2001 | Feret et al. | 138/134 |
| 6,354,333 B1 | 3/2002 | Dupoiron et al. | 138/135 |
| 6,516,833 B1 * | 2/2003 | Witz et al. | 138/135 |

FOREIGN PATENT DOCUMENTS

| | | |
|---|---|---|
| EP | 0 025 121 | 3/1981 |
| EP | 0 266 720 | 5/1988 |
| OA | 8772 | 3/1989 |
| OA | WO 99/57475 | 11/1999 |
| WO | WO 00/09930 | 2/2000 |

* cited by examiner

*Primary Examiner*—Patrick Brinson
(74) *Attorney, Agent, or Firm*—Finnegan, Henderson, Farabow, Garrett & Dunner, L.L.P.

(57) ABSTRACT

Flexible, armored pipes and methods of using the same are disclosed. In an exemplary embodiment, the flexible, armored pipe includes an inner liner which is surrounded by a pressure armor. The inner liner may be built-up by joining together profiles that have a number of recesses. In one embodiment, the profiles are configured as K-profiles, which have recesses that are arranged in adjoining surfaces of the profile. When the profiles are brought together, the recesses form a cavity in which a locking element can be inserted, the function of which is to prevent displacement of the K-profiles at right-angles to the axial direction of the pipe when exposed to axial, compressive forces. The locking element can be I-shaped, circular or configured as a wire with a C-shaped cross-section. The locking element can also be made either of a rigid or an elastic, deformable material. With a C-shaped locking element, the whole of the cavity, which is formed by the recesses, is not filled out. A channel is thereby formed through which undesired fluids can be led away or through which cleaning fluids can be introduced.

17 Claims, 5 Drawing Sheets

ARMOURED, FLEXIBLE PIPE AND USE OF SAME

Figure 1:
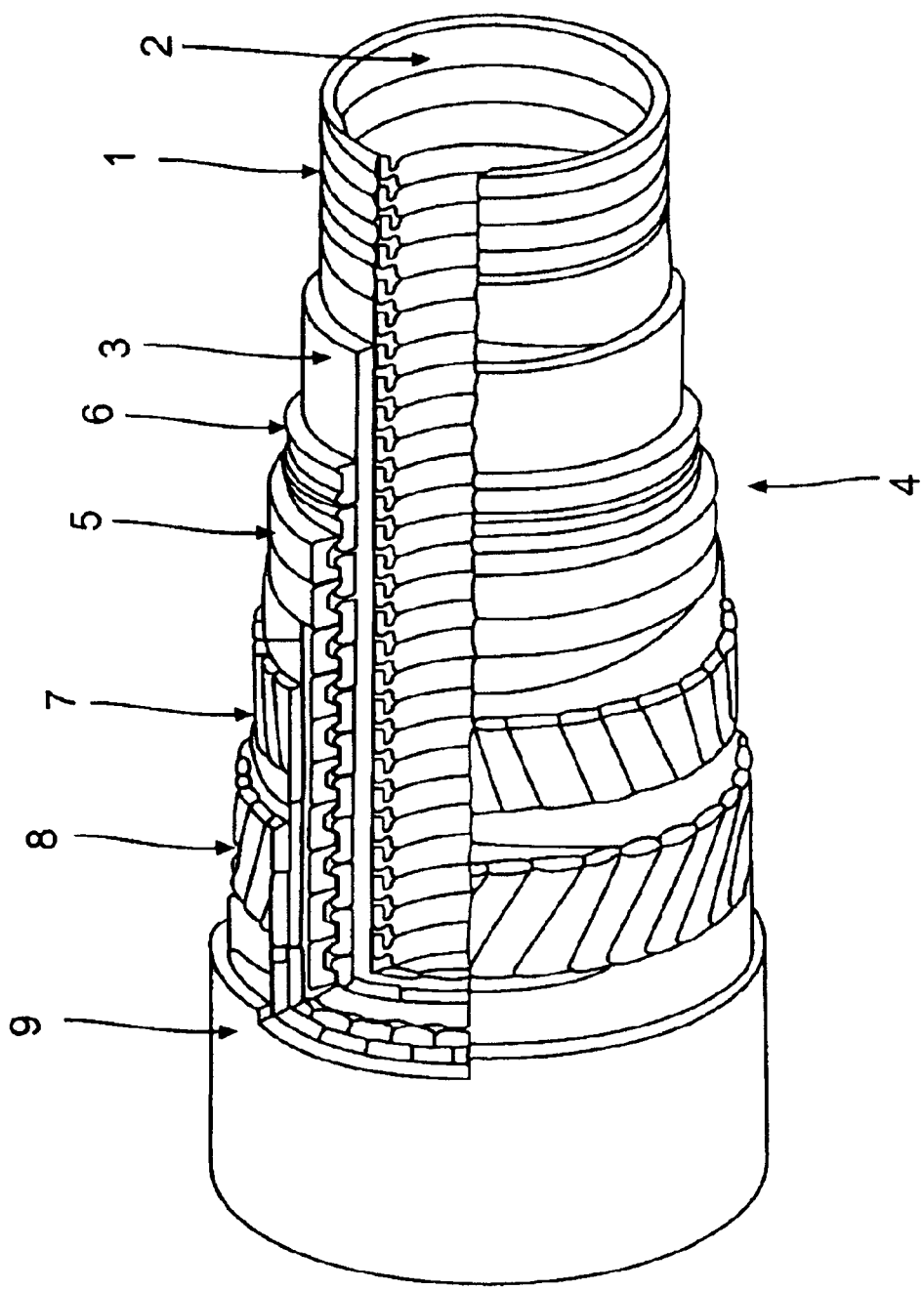

The invention concerns a flexible, armoured pipe comprising an inner liner and a spirally-wound pressure amour surrounding said inner liner, said pressure amour comprising a number of adjoining armour profiles, each of said profiles having a number of recesses, at least two of said recesses being provided along surfaces of said adjoining armour profiles forming a cavity therebetween, and a number of locking profiles, said locking profiles being adapted to hold together said adjoining profiles.

The invention also concerns use of the pipe for transport of fluids.

Pipes of the above-mentioned type normally comprise an inner barrier layer, the so-called inner liner, which forms a barrier against the out-flow of the fluid which is desired to be transported through the pipe. Moreover, pipes of the above-mentioned type comprise an outer barrier layer, the so-called outer liner, which prevents the surrounding environment from influencing the space in between the inner and the outer liner.

On the outside of the inner liner one or more armouring layers are wound, which are not chemically bound to the remaining components of the pipe, but can move in relation to these, which ensures the flexibility of the pipe during laying-out and operation.

The whole of the pipe armouring is most often placed between the inner and the outer liner, but in certain cases only a part of the armouring layers will be placed between the inner and the outer liner, while the remaining part of the armouring is placed outside the outer liner. When a part of the armouring lies outside the outer liner, an additional layer can be applied to the outside of the pipe with the object of protecting the outermost armouring layer against mechanical damage.

In order to prevent the collapse of the inner liner, the inner side of this is often lined with a flexible, wound, permeable pipe, a so-called carcass.

The above-mentioned type of flexible pipe is used, among other things, for the transport of fluids and gases in different depths of water. They are used especially in situations where very high or varying water pressure exists along the longitudinal axis of the pipe. As an example can be mentioned riser pipes which extend from the seabed up to an installation on or near the surface of the sea. Pipes of this type are also used between installations, which are located at great depths on the seabed, or between installations near the surface of the sea.

Some of the armouring layers are wound with a great angle relative to the longitudinal direction of the pipe, and will therefore primarily be able to absorb the radial forces that arise as a result of outer or inner pressure. The profiles thus prevent the collapse or rupture of the pipe as a result of pressure influences and are therefore called pressure armour.

The pressure armour will always lie in the space between the pipe's inner and outer liner, and is most often built up of different profiles in metal.

In that very high inner pressure can exist inside the pipe, a mutual anchoring of the pressure-bearing profiles is of great importance, since a slipping of these along the axis of the pipe can result in too great a mutual profile distance with damage of the inner liner as a consequence. The mutual mechanical anchoring is achieved by configuring the profiles in such a manner that they lock together mechanically when they are wound.

In order to ensure the flexibility of the pipe, the pressure armour layer is designed so that a limited mutual movement of the pressure-bearing profiles is permitted.

Unlike the pressure armour, profiles, which are wound with a small angle in relation to the longitudinal axis of the pipe, will not be able to absorb radial forces to any significant degree, but on the other hand are able to absorb forces exerted along the longitudinal axis of the pipe. In the following, this type of armouring will be referred to as tension armour, in that its primary task is to absorb tensile forces as a result of inner pressure in the pipe and its suspension. The tension armour is placed either in the space between the inner and the outer liner, or on the outside of the outer liner.

Under certain conditions of operation, the pipe will be exposed to compressive, axial forces, which will compress the pipe. Providing that the tension armour is prevented from expanding radially, it will be able to absorb these compressive forces. However, if the pipe is constructed in such a manner that the radial expansion of the pipe's tension armour is not prevented, the tension armour will not be able to absorb the compressive, axial forces, in that these will be absorbed primarily by the inner and the outer liner. This compression can continue until the free volume between the pressure armour profiles is used up, after which the compressive, axial forces will be absorbed primarily by the pressure armour, which is made of a material with far greater rigidity than the inner and outer liner. In this connection it is a problem that the pressure armour is not stable in compression, the reason being that the pressure armour profiles will have a tendency to slide out over each other with subsequent damage to the pipe.

WO00/09930 discloses a tubular, flexible pipe comprising an inner sealing sheath of polymer, a cylindrical pressure vault comprised of a helical wire winding with gaps between windings. The vault comprises elongated masking elements at least partially masking the gaps between the winding of the wire and being at the inner sheath, whereby it is obtained that the problem of "internal sealing sheath creep" is allegedly solved.

U.S. Pat. No. 2,087,876 discloses a self-supporting, flexible, annular strand without a pressure amour and without internal supporting means intended for use as a hollow conductor for high voltage transmission of electric energy, said strand comprising a plurality of helically arranged strips in edge-to-edge relationship to form a tubular structure and wires interposed between and separating edges of said strips, said strips being laterally separable and able to pivot on said wires. The wound strips have a small angle relative to the direction of the pipe, whereby radial forces on the strand open the strips and result in radial forces not being absorbed, i.e. a quite different result than that of the present invention.

It is an object of the present invention to provide a new configuration of pressure armour profiles that prevents the profiles from sliding out over each other.

It is also an object of the invention to increase the barrier characteristics of the pressure armour, which in certain cases can considerably increase the functionality of the finished pipe.

The objects of the invention are achieved in that at least two recesses are locking recesses and that said formed cavity accommodates a locking element.

Means are thus provided in the armouring for the prevention of uncontrolled, radial displacement of the primary, spirally-wound profiles. Moreover, means are provided in the armouring, which prevent a free, or almost free flow between the concave and the convex side of the armouring. Furthermore, the primary, spirally-wound profiles are provided with at least two recesses in which a profile of another kind is placed, whereby a locking of the primary, spirally-wound profiles against mutual, uncontrolled, axial displacement is achieved.

In a most preferred embodiment the profile is configured as a K-profile with four recesses. A locking against uncontrolled, radial displacement is hereby achieved, in that at least two recesses are provided along adjoining surfaces in K-profiles, and in that a locking element is arranged in the space which is formed by the two adjoining recesses.

In other words, the configuration of the armouring according to the invention distinguishes itself from hitherto-known pressure armouring by a mutual locking of the K-profiles, not only along the axial direction of the pipe, but also at right-angles hereto, which can be attributed to the use of locking profiles and locking elements with different functions.

In another embodiment, the K-profile has two recesses which are arranged in the corners of the profile, and that an I-profile is provided in the cavity which is formed by the two recesses in adjoining profiles, whereby it is ensured that in the event of great pressure influences, there is no migration of material, e.g. inner liner material, into the spaces which exist between the profiles.

Preferred embodiments with various locking elements include, in a non-limiting way, locking elements that wholly or partly fill out the cavity, locking elements that are configured as an I-profile, recesses that are semicircular in shape, and locking elements that are configured with a substantially circular cross-section.

In another embodiment the locking element is made of an elastic, deformable material, and an essential barrier against migration of fluids between the concave and convex parts of the armoring is achieved, which can give the armoring an important extra functionality when the locking profile is configured so that the deformation of this is necessary for it to be accommodated in the adjoining recesses.

In another embodiment, by configuring the locking element as a wire with a C-shaped cross-section, it is ensured that a longitudinal channel is provided which, for example, can be used for the leading away of undesired fluids or the supply of cleaning liquids or the like.

Further embodiments of the invention include, in a non-limiting way, locking elements that are configured as a wire with a O-shaped cross-section, locking profiles that are C-shaped, profiles that consist of a material which is wholly or partly made of a metal, a metal alloy or a ceramic-reinforced metal material, profiles that consist of a material which is wholly or partly made of a polymer or an armored polymer, and inner liners that surround a carcass, the carcass being configured as a pressure armor.

As mentioned, the invention also concerns a use of the pipe. This use involves, for example, transporting fluid such as water, ammonia, or hydrocarbons, with the flexible, armored pipe.

Figure 2:
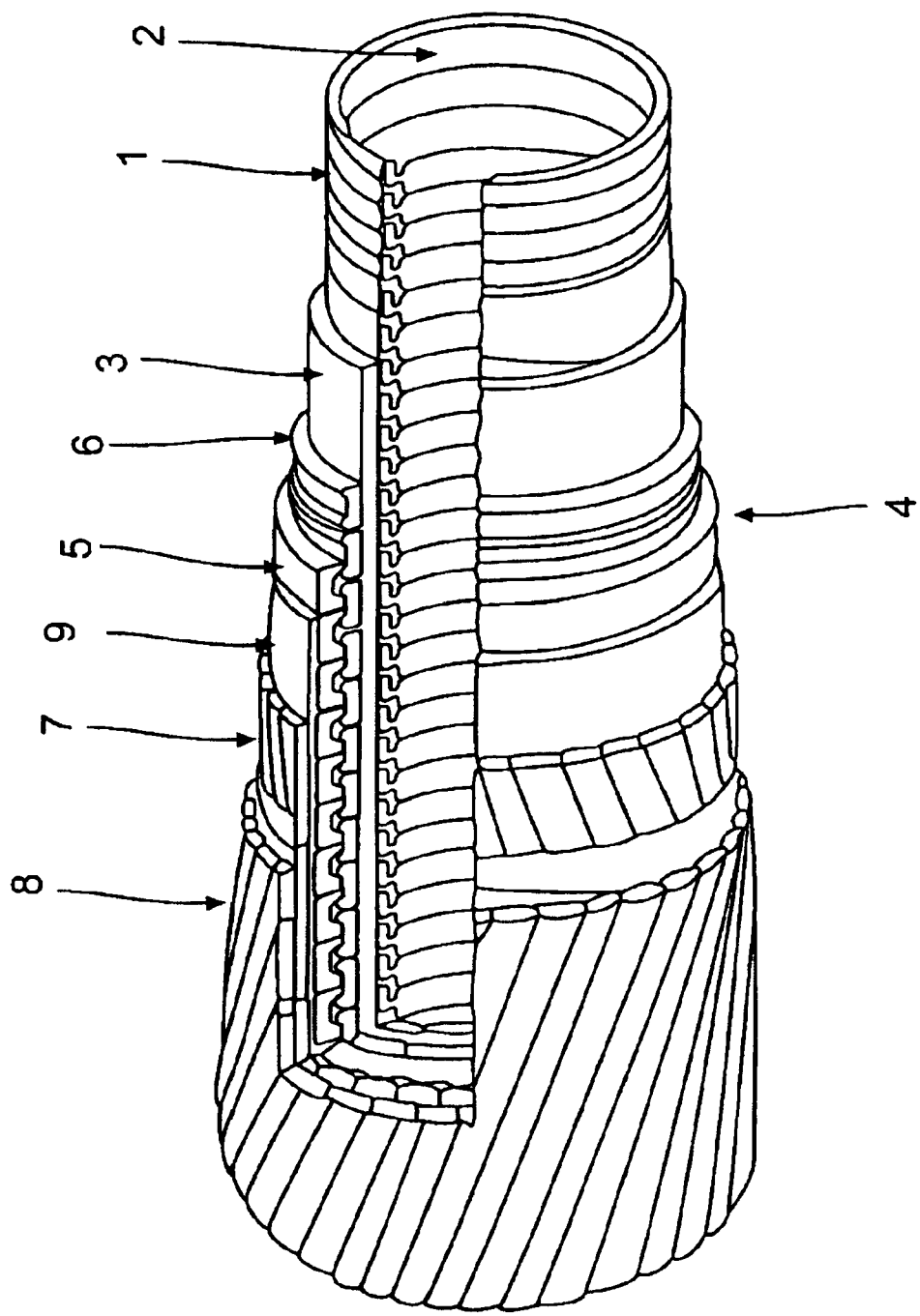
Figure 3:
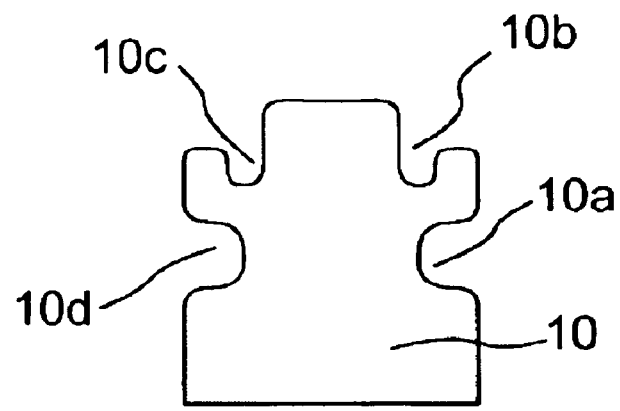
Figure 4:
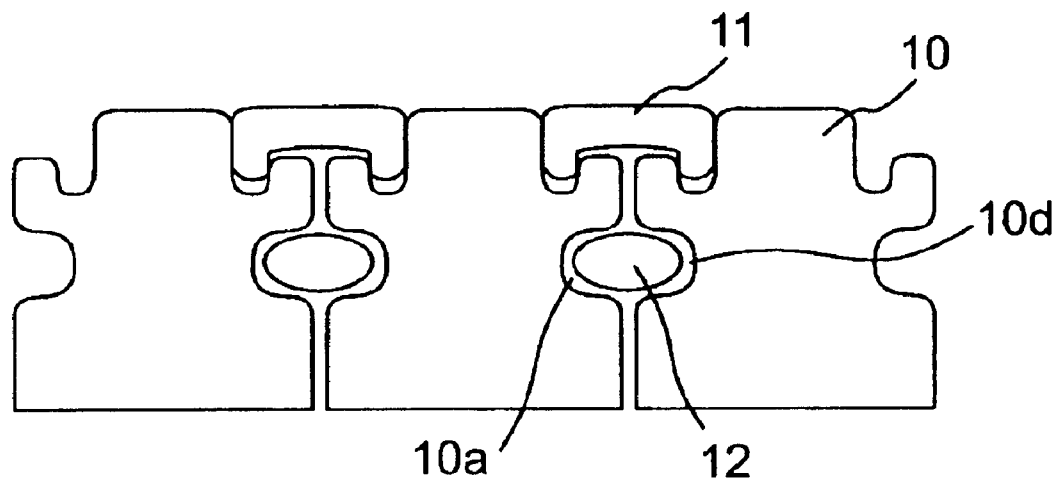
Figure 5:
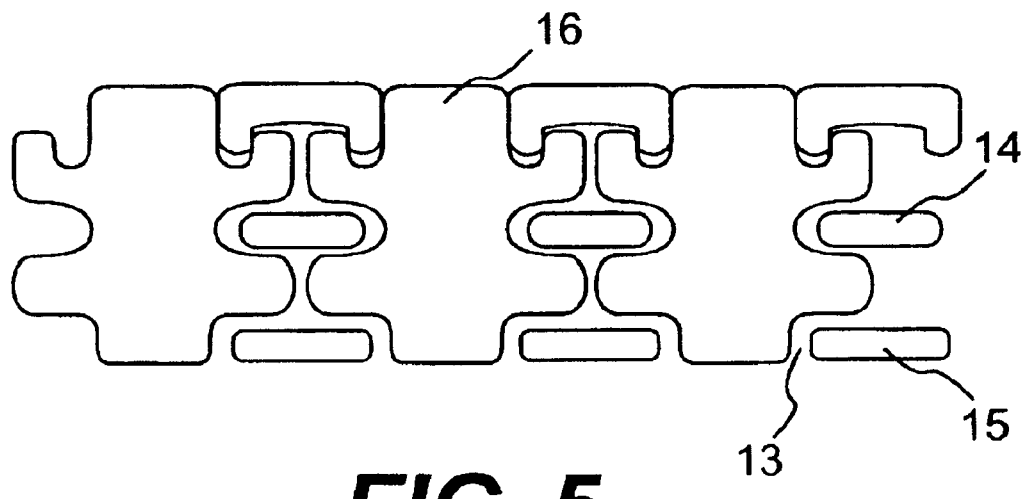
Figure 5A:
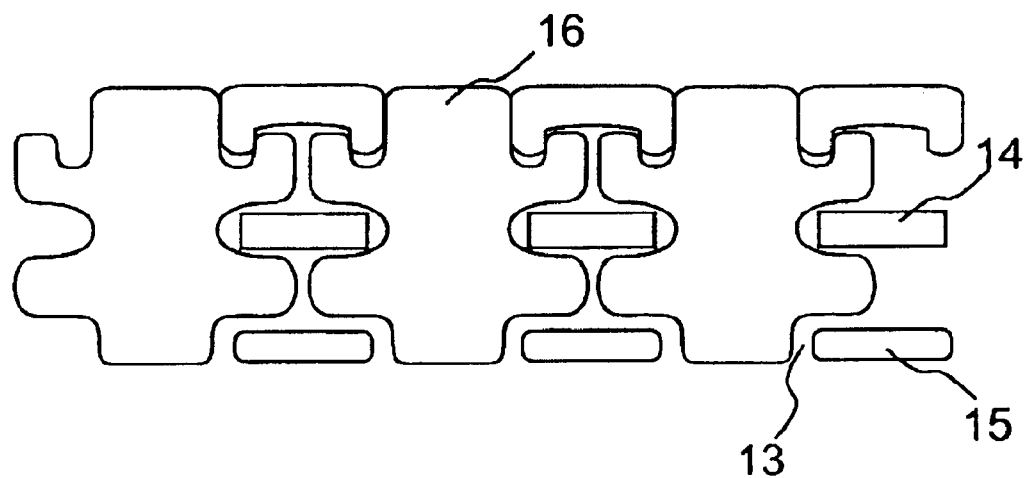

The invention will now be explained in more detail with reference to the drawing, in which FIG. 1 shows a normal construction of a flexible, armoured pipe with its different-layers, FIG. 2 shows an alternative construction of a flexible, armoured pipe, where the tension armour is placed on the outside of the inner liner, FIG. 3 shows a K-profile for the pressure armour according to the invention, FIG. 4 shows K-profiles according to FIG. 3 joined together in the formation of armour, FIG. 5 shows a second embodiment of joined-together K-profiles according to the invention, FIG. 5a shows another embodiment of the invention where the locking element is configured as an I-profile.

Figure 6:
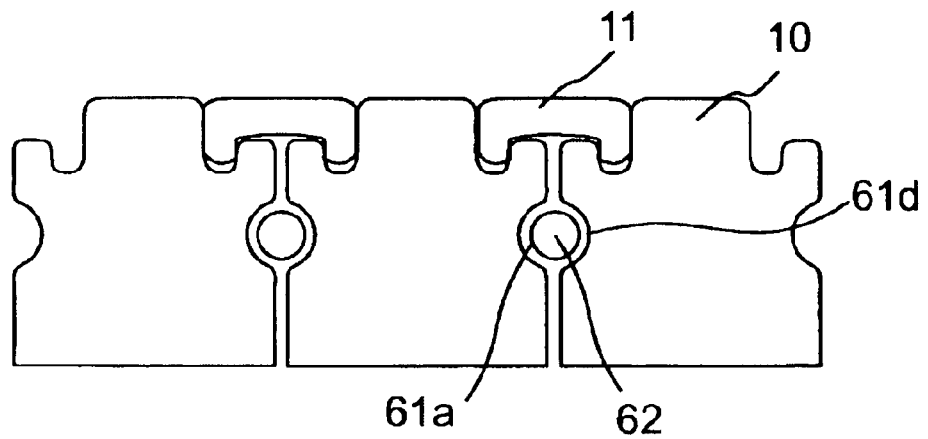
Figure 7:
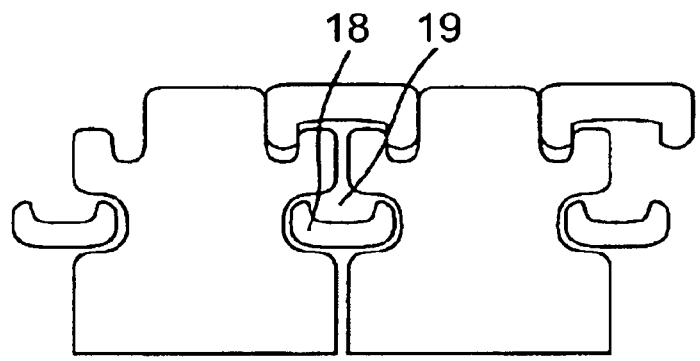
Figure 8:
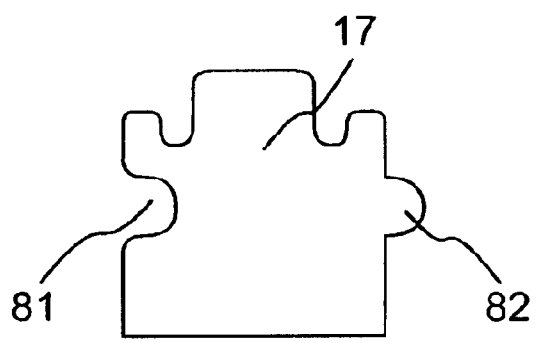

FIGS. 6 & 7 show further embodiments corresponding to FIG. 3, but with other locking elements, while FIG. 8 shows a further embodiment of the profile according to the invention, where a tongue replaces the one of the adjoining recesses and the locking profile.

In FIG. 1 a pipe is seen which consists of an inner liner 3, which surrounds a carcass 1 consisting of a spirally-wound metal band 2, which forms an inner pipe. During its production, the metal band 2 is formed with flaps that engage with one another, so that they hereby lock the individual windings in the metal band 2 to one another in such a manner that the carcass 1 is flexible. Since the inner carcass 1 in itself is not impermeable, the object of the surrounding inner liner 3 is to prevent the flow of fluids to or from the inside of the pipe.

On the outside of the inner liner 3, one or more layers of profiles 5, 6 are wound in a spiral manner, which form a pressure armour having windings with a large angle in relation to the longitudinal direction of the pipe. As a consequence of the large angle, these profiles will primarily be able to absorb radial forces that arise due to inner or outer pressure. The inner pressure arises during operation of the pipe. The outer pressure stems partly from the hydrostatic pressure of the surroundings, and partly from mechanical influences during the laying-out of the pipe. The windings thus form a pressure armour which prevents rupture of the inner liner 3 as a result of a high pressure on the inside of the pipe, or its collapse as a result of a high pressure on the outside of the pipe.

FIG. 1 also shows that a tension armour, which consists of one or more spirally-wound layers 7, 8, is provided on the outside of the pressure armour.

Between the pressure armour and the tension armour an intermediate sheath can be laid, the object of which is to prevent fluids from migrating between the tension armour and the pressure armour. An outer sheath 9 finally surrounds these layers.

Since the present invention does not concern the intermediate sheath, the tension armour and the outer sheath, these elements will not be discussed in more detail.

In comparison with the embodiment in FIG. 1, FIG. 2 shows an alternative positioning of the pipe's outer liner.

An embodiment such as shown in FIG. 2 will prevent the build-up of compressive stresses in the tension armour 7, 8, which makes this embodiment particularly advantageous when the tension armour elements are made of a fibre-reinforced plastic composite.

According to the invention, in a first embodiment as shown in FIG. 3, the pressure armour is built up of K-profiles To which, in a first embodiment, have four locking grooves or recesses 10a, 10b, 10c and 10d. As shown in FIG. 4, these K-profiles are held together by locking profiles in the form of C-profiles 11, which can engage in the recesses 10b, 10c, which lie on the outer side of the pressure armour.

As will also be seen in FIG. 4, in the recesses 10a and 10d, which form a cavity along adjoining edges of the K-profile, a locking element 12 is placed. This locking element 12 absorbs radial forces, which could otherwise displace the K-profiles along the adjoining edges and cause the K-profiles to "tip".

In FIGS. 5 and 5a, variants of the K-profile are shown with the reference number 16. These correspond to the profile in FIG. 3, but with the difference that two of the corners of the K-profile are configured with cut-outs to accommodate an I-profile 15, the function of which is to prevent material, such as liner material, from running from the inside of the pipe out towards the locking elements and the C-profiles, in that a compressive force on the I-profile 15 from the inside of the pipe will block the passage of the material. In FIG. 5*a*, a variant is shown where the locking element 14 is configured as an I-profile.

FIG. 6 shows an embodiment corresponding to that in FIG. 4. The difference is that the recesses 61*a*, 61*d*, are semicircular in shape, and that the locking element 62 has a circular cross-section.

FIG. 7 shows an embodiment like that in FIG. 3, but now with a locking element 18 with a C-shaped cross-section placed in the cavity. This locking element involves that not the entire cavity is filled out, but that a channel 19 is provided in the cavity This channel can possibly be used for the removal of undesired fluids or for the introduction of cleaning fluids into the pipe. The removal can, for example, be controlled by establishing a suitable difference in pressure between the ends of the pipe.

Finally, FIG. 8 shows a variant 17 of the K-profile, which, along its adjoining edges (when two or more K-profiles engage with one another), is provided with a recess 81 and a tongue 82 corresponding hereto. In this way, it becomes possible to avoid the use of locking elements, which can have certain advantages from the point of view of production technique.

For all of the embodiments described, it applies that the material in that profile which prevents slipping will not be loaded as heavily as the surrounding K-profiles. In the configuration of this profile, there is thus great freedom of choice of materials other than the material of which the K-profiles are made, should this be is expedient.

As examples of the use of alternative metals, mention can be made of a round wire, cf. FIG. 6, where this wire can be made of a metal or an alloy with a lower semi-conductor potential than that metal of which the surrounding K-profiles are made. Such a method will ensure cathodic protection of the K-profiles.

Another example can be in an embodiment as shown in FIG. 7, merely with a zinc strip rolled down in the C-profile 18, which is surrounded by K-profiles 10. Since this zinc strip will be in galvanic contact with the surrounding armour, it will effect a very effective protection of the system against corrosion.

It is obvious that the present invention can be exercised in other ways than those shown above while still within the scope of the patent claims.

For example, the K-profiles can with advantage also be used as internal pressure armour in the inner liner, in cases where this is desired to be armoured against very great external compressive forces.

Furthermore, there is great freedom in the use of the principles of the invention in cases where several pipes are connected by means of coupling elements etc.

What is claimed is:

1. A flexible, armored pipe, the pipe comprising:
   (A) an inner liner; and
   (B) a spirally-wound pressure armor surrounding said inner liner, said pressure armor comprising:
       (a) a number of adjoining armor profiles, each of said profiles having a number of recesses, at least two of said recesses being provided along surfaces of said adjoining armor profiles forming a cavity therebetween; and
       (b) a number of locking profiles, said locking profiles being adapted to hold together said adjoining profiles;
   wherein said at least two recesses are locking recesses and further wherein said formed cavity accommodates a locking element.

2. The pipe according to claim 1, wherein each of said amour profiles is configured as a K-profile with four recesses.

3. The pipe according to claim 2, wherein the K-profile includes two recesses which are arranged in the corners of each profile, and further wherein an I-profile is provided in a cavity which is formed by the two recesses in adjoining profiles.

4. The pipe according to claim 1, wherein the locking element wholly or partly fills out the cavity.

5. The pipe according to claim 1, wherein the locking element is configured as an I-profile.

6. The pipe according to claim 1, wherein the at least two recesses are semicircular in shape.

7. The pipe according to claim 6, wherein the locking element is configured with a substantially circular cross-section.

8. The pipe according to claim 1, wherein the locking element is made of an elastic, deformable material.

9. The pipe according to claim 1, wherein the locking element is configured as a wire with a C-shaped cross-section.

10. The pipe according to claim 1, wherein the locking profiles are C-shaped.

11. The pipe according to claim 1, wherein the profiles consist of a material which wholly or party is made of metal, a metal alloy or a ceramic-reinforced metal material.

12. The pipe according to claim 1, wherein the profiles consist of a material which wholly or party is made of polymer or an armored polymer.

13. The pipe according to claim 1, wherein the inner liner surrounds a carcass, the carcass being configured as the pressure armor.

14. A method of using a flexible, armored pipe according to any of claims 1–13, wherein the method comprises transporting fluid with the flexible, armored pipe.

15. A method according to claim 14, wherein the fluid is water.

16. A method according to claim 14, wherein the fluid is ammonia.

17. A method according to claim 14, wherein the fluid is hydrocarbons.

* * * * *

UNITED STATES PATENT AND TRADEMARK OFFICE
CERTIFICATE OF CORRECTION

PATENT NO. : 6,739,355 B2
DATED : May 25, 2004
INVENTOR(S) : Kristian Glejbøl et al.

It is certified that error appears in the above-identified patent and that said Letters Patent is hereby corrected as shown below:

Column 6,
Lines 40 and 43, change "party" to -- partly --.

Signed and Sealed this

Twenty-eighth Day of December, 2004

JON W. DUDAS
*Director of the United States Patent and Trademark Office*